United States Patent Office 3,086,913
Patented Apr. 23, 1963

3,086,913
SYSTEMIC FUNGICIDES
James M. Hamilton, 574 S. Main St., and Michael Szkolnik, R.D. 2, both of Geneva, N.Y., and Ernest Sondheimer, Geneva, N.Y. (956 Westmoreland Ave., Syracuse 10, N.Y.)
No Drawing. Continuation of application Ser. No. 615,752, Oct. 15, 1956. This application Apr. 27, 1962, Ser. No. 190,767
6 Claims. (Cl. 167—65)

This invention relates to novel compositions of matter and to a novel process and is particularly directed to novel compositions and a novel process for the controlling of plant diseases.

Cycloheximide is an antibiotic substance produced as an elaboration product of *Streptomyces griseus* according to the procedures set forth in U.S. Patents 2,574,519 and 2,612,502; by Leach et al. in J. Am. Chem. Soc. 69, 474 (1947); and by Ford et al. in J. Am. Chem. Soc. 70, 1223–1225 (1948). Cycloheximide has been found to be an effective fungicide and to be particularly useful in the control of plant diseases.

It is known that when cycloheximide is reacted with acetic anhydride, the acetate, melting point 148–149 degrees centigrade, is obtained. This compound has heretofore been thought to be biologically inactive. See Ford et al. and Leach et al. supra. Although Leach et al. report a diacetate, it was subsequently found that cycloheximide contains only one hydroxyl group and that the acetate was really the monoacetate. See Ford et al., supra, and Kornfeld et al., J. Am. Chem. Soc. 71, 150–159 (1949). Various other known derivatives of cycloheximide also have been considered to be inactive or to have little value when compared with cycloheximide.

It has now been found that certain derivatives of cycloheximide are effective for the control of plant fungal diseases, and that quite surprisingly the compounds are translocated so that new foliage growth is protected as well as the treated foliage. This is surprising because cycloheximide is not translocated. It is a surface protectant and also acts to eradicate established infections in the treated foliage.

The derivatives of cycloheximide which have been found to be effective are the carboxylic acid esters, particularly the lower alkanoic acid esters, such as the acetate, and the derivatives which are formed by reaction with the keto group of cycloheximide, such as the oxime, the semicarbazone, dehydrocycloheximide, anhydrocycloheximide, and cycloheximide isomer.

In carrying out the invention, the active material oxime advantageously is dissolved in water and the water solution sprayed on foliage of plants which it is desired to protect from fungal attack. Thus the concentration of the active material in the solution may range from around one to around 100 parts per million, or up to the solubility of the active material in water. Such solutions advantageously are prepared by dissolving the active material in a water-miscible solvent such as dimethyl-formamide, acetone, methanol, or ethanol and adding the resulting solution to the spray tank with proper stirring and agitation. By the use of such concentrated solutions in which the active material suitably can range from about one to about 25 percent or more depending upon the solubility in the solvent, the very dilute aqueous solutions which are advantageously employed according to the invention are readily prepared. A concentrate containing one percent of the active material in ethanol provides a composition which for each level teaspoon (5 cc.) per gallon give about thirteen to fourteen parts of the active material per million parts of water. Each pint per 100 gallons provides about the same concentration. Similarly a 17.5 percent solution in dimethylformamide (or acetone or methanol or ethanol) when diluted provides about thirteen to fourteen parts of the active material for each million parts of water.

Wetting and spreading agents can be included in the spray solutions in accordance with the usual practice in the agricultural art. Anionic, cationic and non-ionic surfactants can be used. Suitable surfactants include alkyl sulfates and sulfonates, alkylarylsulfonates, sulfosuccinate esters, polyoxyethylene sulfates, polyoxyethylene sorbitan monolaurate, alkylarylpolyether sulfates, alkylarylpolyether alcohols, alkylnaphthalene sulfonates, alkyl quaternary ammonium salts, sulfated fatty acid esters, sulfated fatty acid amides, glycerol mannitan laurate, polyalkylether condensates of fatty acids, and ligninsulfonates.

If desired, the active material can be compounded into a wettable powder. Thus the active material can be milled with an inert powder such as talc, pyrophyllite, Georgia clay, bentonite, or mixtures thereof and a wetting and dispersing material to provide a composition which is readily incorporated into a spray solution. A suitable formulation is obtained by milling and blending 434.5 pounds of Georgia clay, 4.5 pounds of Triton X–100 (an alkylarylpolyether alcohol) as a wetting agent, 9 pounds of Daxad 27 (polymerized sodium salts of substituted benzoic long chain alkyl sulfonic acid) as a dispersant, and 5.5 pounds of the active material. The resulting composition has the following percentage (by weight) composition.

| | Percent |
|---|---|
| Active material | 1.2 |
| Triton X–100 | 1 |
| Daxad 27 | 2 |
| Georgia clay | 95.8 |

This formulation when added to water at one pound per hundred gallons gives a spray formulation containing about 13 to 14 parts per million of the active material.

The efficacy of the compositions for the control of cherry leaf spot caused by *Coccomyces hiemalis* is illustrated in the following tables.

Young cherry trees were sprayed with aqueous solutions containing the active material in the concentrations indicated and allowed to grow for five days. After five days (A), one week (B), two weeks (C), and three weeks (D) the plants were inoculated with *Coccomyces hiemalis*.

Table I

| Treatment | Leaf Spot on New Leaves— Lesions per 2 sq. in. | | | |
|---|---|---|---|---|
| | A | B | C | D |
| Cycloheximide oxime: | | | | |
| 10 p.p.m | 39 | | 20 | |
| 30 p.p.m | | 17 | | 20 |
| 60 p.p.m | 13 | 4 | trace | 4 |

CONTROL

| | | | | |
|---|---|---|---|---|
| Unsprayed | 69 | 49 | | 39 |
| Cycloheximide: 1 p.p.m | | 50 | 83± | |

Table II gives the comparative incidence of leaf spots on new leaves in lesions per 2 square inches for a number of the active compounds. As in the tests shown in Table I, young cherry trees were sprayed with aqueous compositions containing the active materials in the concentrations indicated and were inoculated with *Coccomyces hiemalis* after five days.

Table II

| Treatment: | Lesions per 2 sq. in. |
|---|---|
| Unsprayed | 69 |
| Cycloheximide oxime, 10 p.p.m | 39 |
| Cycloheximide oxime, 60 p.p.m | 13 |
| Cycloheximide semicarbazone, 10 p.p.m | 2 |
| Cycloheximide isomer, 10 p.p.m | 1 |
| Cycloheximide acetate, 10 p.p.m | 5 |
| Anhydroheximide, 10 p.p.m | 17 |
| Dehydroheximide, 10 p.p.m | 32 |

The data given in these tables show that the infection was controlled in the new foliage and therefore that the fungicide was translocated from the old foliage to the new.

It is to be understood that the invention is not to be limited to the exact details of operation or exact compounds shown and described, as obvious modifications and equivalents will be apparent to one skilled in the art, and the invention is therefore to be limited only by the scope of the appended claims.

This application is a continuation of our application Serial No. 615,752, filed October 15, 1956, now abandoned.

We claim:

1. A process for controlling fungal diseases of plants which comprises applying to the plant a compound that translocates systemically in the plant to growth developing after the application of the compound to the plant whereby protection of post-application new growth as well as old growth is obtained, said compound being selected from the group consisting of cycloheximide oxime and cycloheximide semicarbazone.

2. A process as defined in claim 1 wherein the compound is cycloheximide oxime.

3. A process as defined in claim 1 wherein the compound is cycloheximide semicarbazone.

4. A composition for controlling fungus diseases of plants comprising in admixture a compound that on application to a plant translocates systemically in the plant to growth developing after application of the compound to the plant whereby protection of post-application growth is obtained, a surfactant, and a carrier, said compound being selected from the group consisting of cycloheximide oxime and cycloheximide semicarbazone.

5. A composition as defined in claim 4 wherein the compound is cycloheximide oxime.

6. A composition as defined in claim 4 wherein the compound is cycloheximide semicarbazone.

References Cited in the file of this patent

UNITED STATES PATENTS

| | | |
|---|---|---|
| 2,885,320 | Murray | May 5, 1959 |
| 2,894,872 | Murray | July 14, 1959 |
| 2,903,457 | Ford | Sept. 8, 1959 |
| 2,980,580 | Klomparens | Apr. 18, 1961 |
| 2,982,687 | Klomparens | May 2, 1961 |
| 2,982,688 | Klomparens | May 2, 1961 |

OTHER REFERENCES

Hamilton et al.: "Systemic Control of Cherry Leaf Spot Fungus by Foliar Sprays of Actidione Derivatives," Science 123, pp. 1175–1176, June 29, 1956.

Hacker et al.: "Cycloheximide Analogues Cause Preinfection Resistance to *Puccinia graminis* var. *tritici* in Spring Wheat," Phytopathology 47, p. 14 (1957).

Hacker et al.: "Chemically Induced Resistance to Stem Rust of Wheat by Derivatives of Actidione," Plant Disease Reporter 41, pp. 442–446 (1957).

Hacker et al.: "Report on 1957 Field Tests of Actidione Derivatives for Control of Black Stem Rust of Wheat," Plant Disease Reporter 42, pp. 609–613 (1958).

Lemin et al.: "Degradation of Cycloheximide Derivatives in Plants," Plant Disease Reporter 41, pp. 447–448, (1957).

Wallen: "Control of Stem Rust of Wheat With Antibiotics II, Systemic Activity and Effectiveness of Derivatives of Cycloheximide," Plant Disease Reporter 42, pp. 363–366 (1958).

Wallen et al.: "The Systemic Activity of Cycloheximide in Seedlings," Phytopathology 47, pp. 291–294 (May 1957).

Goldberg: "Antibiotics, Their Chemistry and Non-Medical Uses," D. Van. Nostrand Co. Inc., pp. 347–348, 362–363 (copyright 1959).

UNITED STATES PATENT OFFICE
CERTIFICATE OF CORRECTION

Patent No. 3,086,913            April 23, 1963

James M. Hamilton et al.

It is hereby certified that error appears in the above numbered patent requiring correction and that the said Letters Patent should read as corrected below.

In the grant, lines 1 to 3, for "James M. Hamilton and Michael Szkolnik, both of Geneva, New York, and Ernest Sondheimer, of Geneva, New York," read -- James M. Hamilton and Michael Szkolnik, both of Geneva, New York, and Ernest Sondheimer, of Geneva, New York, assignors to Research Corporation, of New York, N. Y., a corporation of New York, --; lines 12 and 13, for "James M. Hamilton, Michael Szkolnik, and Ernest Sondheimer, their heirs" read -- Research Corporation, its successors --; in the heading to the printed specification, lines 3 to 6, for "James M. Hamilton, 574 S. Main St., and Michael Szkolnik, R. D. 2, both of Geneva, N. Y., and Ernest Sondheimer, of Geneva, N. Y. (956 Westmoreland Ave., Syracuse 10, N. Y.) read -- James M. Hamilton and Michael Szkolnik, both of Geneva, N. Y., and Ernest Sondheimer, Geneva, N. Y., assignors to Research Corporation, New York, N. Y., a corporation of New York --.

Signed and sealed this 3rd day of December 1963.

(SEAL)
Attest:
ERNEST W. SWIDER

Attesting Officer

EDWIN L. REYNOLDS

Acting Commissioner of Patents